United States Patent [19]
Griffiths

[11] 3,782,596
[45] Jan. 1, 1974

[54] METHOD OF PREHEATING A TUNDISH
[75] Inventor: David K. Griffiths, Penn Hills, Pa.
[73] Assignee: United States Steel Corporation, Pittsburgh, Pa.
[22] Filed: May 2, 1972
[21] Appl. No.: 249,645

Related U.S. Application Data
[62] Division of Ser. No. 48,353, June 22, 1970.

[52] U.S. Cl................ 222/1, 164/281, 222/146 H, 222/148
[51] Int. Cl............................................ B22d 37/00
[58] Field of Search............ 222/1, 146 H, 146 HS, 222/152, DIG. 13, DIG. 12, 148; 164/281, 336, 337; 266/39

[56] References Cited
UNITED STATES PATENTS
3,630,509  12/1971  Davis et al.................. 222/DIG. 13

FOREIGN PATENTS OR APPLICATIONS
1,138,187  4/1954  Germany........................ 222/146 H
1,125,698  8/1968  Great Britain............... 222/DIG. 12

Primary Examiner—Robert B. Reeves
Assistant Examiner—David A. Scherbel
Attorney—Ralph H. Dougherty

[57] ABSTRACT

A tundish which is capable of draining molten oxide and skull material therefrom while being preheated, and a method of preheating the tundish which prevents plugging of the teeming nozzle.

2 Claims, 4 Drawing Figures

METHOD OF PREHEATING A TUNDISH

This is a division of application Ser. No. 48,353, filed June 22, 1970.

This invention relates to a refractory-lined tundish and to a method of preheating a tundish after it has once been used prior to reusing it. Although the invention is not so limited, it is particularly useful in the continuous casting of steel.

Tundishes used in continuous casting generally exhibit a high surface-to-volume ratio, a condition conducive to the formation of skull, which is a solidified layer of steel and slag left inside a tundish after completion of the teeming operation. Usually this skull must be removed mechanically before the tundish is reusable. If an attempt is made to remove a skull by melting, it oxidizes and the melted iron oxide flows to the nozzle well and tends to plug nozzles. The tundish must be reheated before use in order to minimize the formation of a skull. If the tundish is being reused, the tundish preheating temperature should be limited to about 2,500°F, the melting temperature of iron oxide. However, the presence of alumina in the skull composition decreases the melting temperature of the skull to between 2,200°–2,300° F. This temperature limit appreciably decreases the amount of preheat that may be applied to the refractory lining in a given amount of time.

A tundish is generally preheated at a preheating station remote from the operating position. Therefore the tundish can be preheated for a long period of time without interfering with other procedures required preparatory to casting.

When a tundish is preheated in the conventional manner, the pouring nozzle frequently inadequately heated. This is caused by a partial vacuum within the vessel which permits air infiltration through the nozzle. Because of buoyancy effects, the nozzle, which is at the lowest point of elevation in the tundish, is in fact the point of lowest pressure. Air infiltration cools the nozzle and, when pouring is initiated, liquid steel tends to freeze in the relatively cold nozzle. The molten skull material also has a tendency to freeze when contacting the pouring nozzle.

It is therefore an object of my invention to provide a method of preheating a tundish, which method avoids plugging of the pouring nozzle by molten iron oxide.

It is also an object of my invention to provide a tundish, which, when properly preheated, discharges melted material from the skull rather than retaining it.

These and other objects will be more apparent after referring to the following specification and attached drawings, in which.

Figure 1:
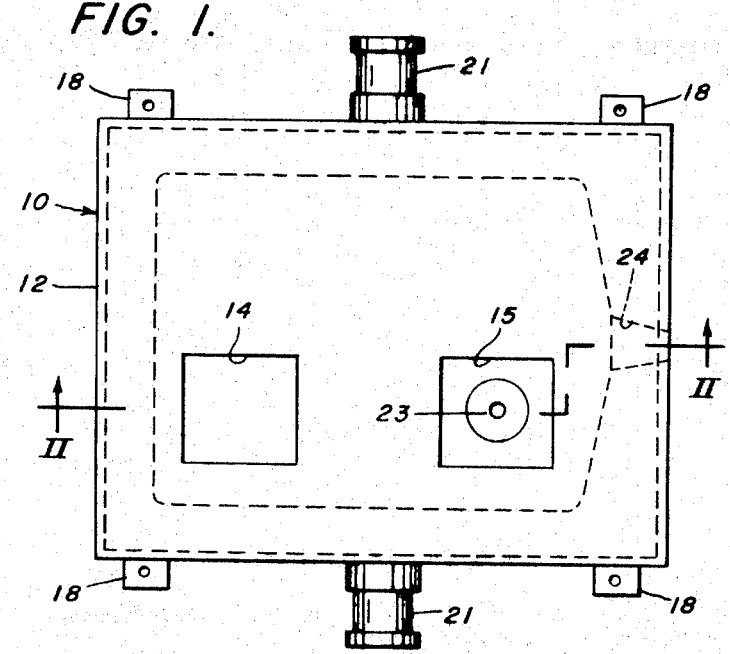
FIG. 1 is a plan view of the tundish of my invention.
Figure 2:
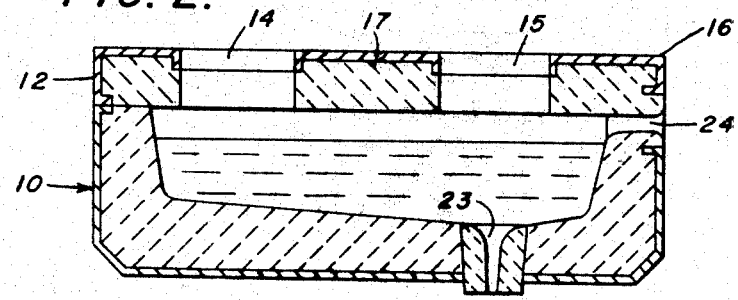
FIG. 2 is a cross-sectional view of the tundish taken along line II—II of FIG. 1.
Figure 3:
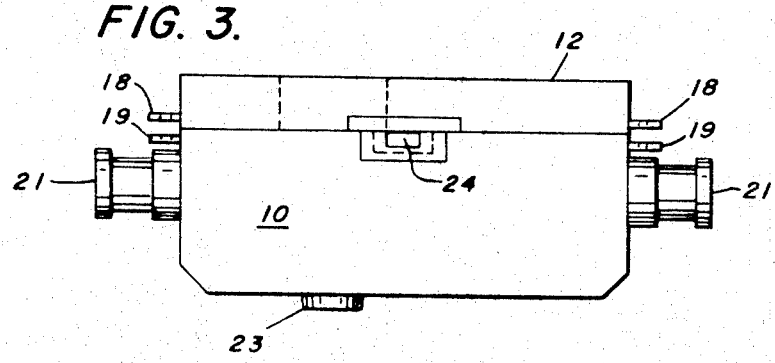
FIG. 3 is an end elevational view of the tundish from the right of FIG. 1.

Referring now to the drawings, a refractory-lined tundish 10 is equipped with a cover 12 to reduce heat losses while metal is teemed therefrom. The cover has a filling opening 14 to accommodate the ladle pouring stream and a viewing opening 15 for observation of the liquid metal level and other operatonal procedures. These openings in the cover are used also as mounting positions for a preheating burner and for discharge of exhaust gases, as hereinafter explained. The burners are removed when the tundish is moved into operating position immediately before casting is initiated.

According to my invention, I turn the tundish 90° on a horizontal axis and preheat the tundish in this position. I provide means for turning the tundish, means for draining iron oxide therefrom and means for fastening the cover thereto.

Cover 12 has a steel shell 16 lined with refractory 17, and has lugs 18 that are in alignment with lugs 19 on tundish 10. The cover is fixed into position by fastening lugs 18 to lugs 19 by bolting or other suitable means.

Tundish 10 is equipped with supporting trunnions 21 about which it can be turned on a horizontal axis. The common axis of the trunnions lies on any line of balance of the tundish and above its center of gravity. The tundish carries a nozzle 23 in its bottom wall and a slag drain 24 in its end wall. The slag drain is lined on three sides by the tundish refractory, and on one side by cover refractory 17. Nozzle 23 is at the lowermost position when the tundish is in its horizontal or pouring position, while slag drain 24 is in the lowermost position when the tundish is in its vertical, or preheat position.

Figure 4:
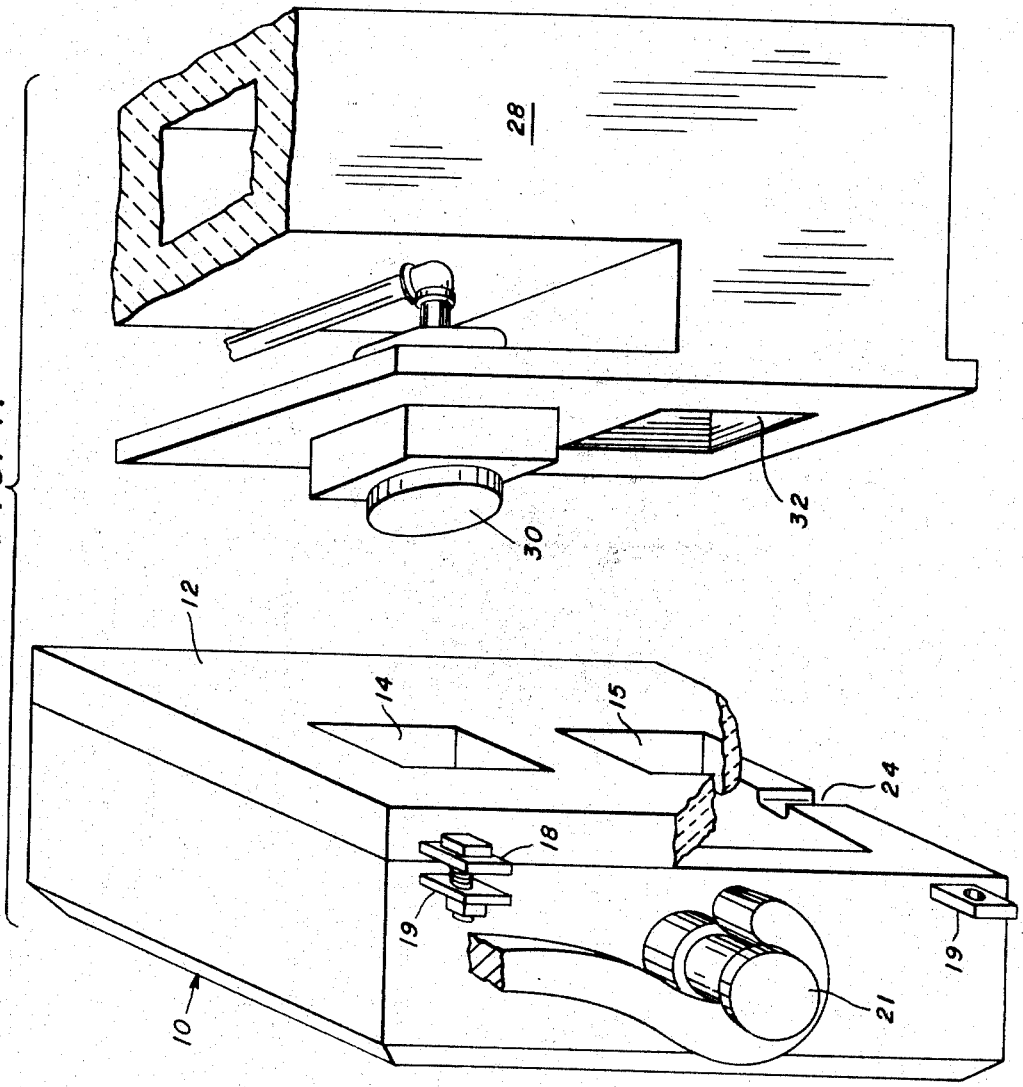
FIG. 4 is a partially cutaway isometric view of the tundish and the preheating mechanism.

In operation, when the tundish 10 is to be preheated, it is turned about trunnions 21 to its vertical position with slag drain 24 at the lowermost position. As shown in FIG. 4, it is brought to a position in which its cover 12 contacts a stack 28. Burner 30 is inserted into the filling opening 14, and the viewing opening 15 is aligned with the exhaust opening 32 to provide a continuous gas outlet from the tundish interior through stack 28. As the skull is heated above its melting point, molten skull runs down the sides of tundish 10 and through slag drain 24 to a thimble (not shown) or other suitable receptacle.

In the vertical position, a tundish may be preheated to a temperature in excess of 2,300° F (approaching 3,000° F). Since skull formation is a function of vessel preheat temperature as well as surface-to-volume ratio, the higher preheat aids in inhibiting the formation of skull whenever a tundish is reused without benefit of mechanical skull removal. In addition, the nozzle is no longer at the point of lowest pressure as it is substantially above the lowest point in the tundish. Thus molten skull material tends to flow away from the nozzle and toward the slag drain.

A preheating station for heating the tundish in the vertical position in accordance with the invention requires less space than a conventional horizontal station. A fixed vertical preheating station is also easier to maintain than a conventional station, which requires cantilevered burners and suspended refractories.

From the foregoing, it is readily apparent that my invention prevents plugging of a tundish pouring nozzle by molten iron oxide, and indeed discharges such molten skull material rather than retaining it.

I claim:

1. A method of preheating a closed, refractory-lined tundish having filling and viewing openings in the cover, a teeming nozzle in the bottom wall, and a discharge port in the end wall, said tundish having previously been used and having metal oxide, slag, skull, or other undesirable material remaining therein, said method comprising:

turning the tundish about a horizontal axis until the discharge port is in the lowermost position, inserting a burner into one of said filling and viewing openings in said cover, aligning an exhaust means with the other of said openings in said cover, igniting said burner,
heating said tundish to a temperature above the melting point of the material remaining in said tundish for a sufficient time to melt said material, and
allowing the molten material to flow out of said tundish through said discharge port.

2. A method of preheating a tundish as defined in claim 1 in which said tundish is heated to a temperature between 2,300° and 3,000° F.

* * * * *